Dec. 5, 1933.   C. F. REIS   1,938,040
MAGNETO ROTOR
Filed May 8, 1931
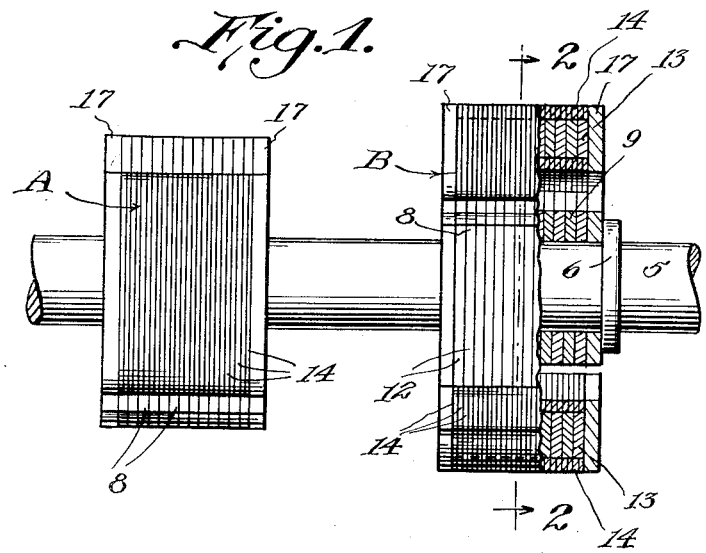
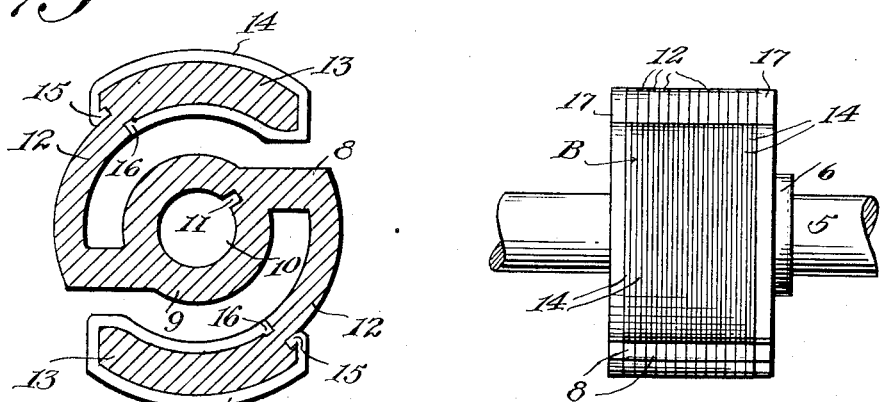
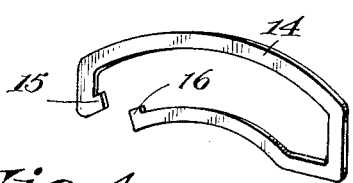
Inventor
Curt F. Reis
By
Eccleston & Eccleston,
Attorneys

UNITED STATES PATENT OFFICE 1,938,040

MAGNETO ROTOR

Curt Frederick Reis, Chicago, Ill., assignor to Excel Magneto Co., Chicago, Ill.

Application May 8, 1931. Serial No. 536,029

8 Claims. (Cl. 171—209)

My invention relates to magnetos and particularly to rotors for magnetos and other electric generators and motors, employing a rotating element of magnetic material.

One object of my invention is to produce a rotor of simple construction, in which a long magnetic path may be secured with a rotor of small diameter.

Another object of the invention is to produce a rotor in which magnetic plates form the body and in which the ends of these plates carry pole-shoes made up of laminations of such shape as to interlock with these plates and hold the pole-shoes assembled.

Still another object of the invention is to produce a rotor assembly in which the pole-shoes embrace portions of the rotor plates and are held in place by the same means which holds the plates in position.

A still further object is to produce a magneto having a plurality of rotors on one shaft and adaptable to different angular arrangements.

Other objects will appear from the following description when taken in connection with the accompanying drawing, in which Figure 1 is a side elevational view partly in section, of a construction in which two rotors embodying my invention are mounted on a single shaft.

Figure 2 is a sectional view on line 2—2 of Figure 1.

Figure 3 is an elevational view showing a rotor shaft on which is mounted a single rotor embodying my invention; and Figure 4 is a detail perspective view showing one form of pole-shoe lamination suitable for use in rotors embodying my invention.

Referring to Figure 1, the reference character 5 designates a conventional rotor shaft having a flange 6 against which a rotor may be made to abut and be held by a nut or other suitable fastening means. As shown in this view, this shaft 5 carries two rotors A and B, mounted in spaced relation and having their poles in staggered relation. The fastening means is omitted in connection with rotor A, but it may obviously comprise the same parts as those shown in connection with rotor B. Since these rotors may be of the same construction, a description of one will suffice for both.

The rotor B comprises a plurality of plates 8 of magnetic material such as magnet steel. These plates are substantially S-shaped and of a thickness enabling them to function as permanent magnets without undue losses and such as to make it practicable to form them of steel punchings. The S-shaped plates comprise a central circular portion 9 containing a suitable shaft opening 10, with a key slot 11 joining it. The central portion 9 is extended to form two arms terminating in free ends 13. Embracing each end 13 is a magnetic lamination 14 having two locking portions 15 and 16 which fit into and interlock with suitable notches provided in the ends 13 of each plate.

The laminations 14 may be of soft iron, silicon steel or other suitable magnetic material such as is used in pole-shoe construction. These laminations are preferably of less thickness than the plates 8 so that the pole-shoes are practically free from eddy current losses. The plates 8 are shown as abutting but may obviously be separated by insulating sheets as is well known in the art. The details of assembly are clearly shown by the section of rotor B in Figure 1. The plates and laminations are preferably held in place by end plates 17 of non-magnetic material having the same contour as a composite plate and lamination, such as is shown in Fig. 2. When these laminations are mounted on their plates and the end plates 17 are secured in position, the entire rotor forms a rigid unitary construction, and the plates and the pole-shoe laminations are securely held in place. Although as here shown these end-plates are held by the same means that hold the rotor plates together, it will be obvious that suitable rivets, bolts or the like may be employed for this purpose.

Figure 3 shows a single rotor carried on the shaft 5 and embodying the construction shown in Figure 1.

In Figure 1, I have shown a structure wherein two rotors are employed, their poles being relatively displaced through an angle of 90 degrees.

It will be clear that with the rotor construction which I have described all of the parts are held together as an efficient compact unit which can be readily assembled and disassembled, thus having the advantages of cheapness, efficiency and simplicity. Another great advantage of this is that the cross-sectional contour of the rotor is such as to provide a long flux path plates 8 is such as to provide a long flux path capable of furnishing a strong magnetic field and yet the diametral dimensions of the rotor are held within ordinary limits.

Although I have herein shown and described only a single form of magneto embodying my invention, it will be obvious that changes may be made in the details thereof, within the scope of the claims without departing from the spirit and scope of my invention.

What I claim is:

1. A magneto rotor comprising a plurality of substantially S-shaped permanent magnetic plates assembled in stacked relation, and a separate magnetic lamination secured on each end of each plate and in the same plane therewith, said laminations substantially surrounding the ends on which they are carried.

2. A magneto rotor made up of stacked permanent magnetic plates of S-shape, the ends of said plates having laminations substantially surrounding them and in the same plane therewith.

3. In a magneto rotor an S-shaped plate of permanent magnetic material, each end of said plate having a magnetic lamination substantially surrounding it and in the same plane therewith.

4. In a magneto, a rotor made up of stacked magnetic plates S-shaped in contour, pole-shoes on each end of said plates, said pole-shoes being made up of laminations of magnetic material, of less thickness than the plates and in the same plane therewith, and means for holding said plates and pole-shoes in assembled relation.

5. A magneto rotor comprising magnetic plates of S-shape, magnetic pole-shoes carried by said plates and substantially surrounding their ends and interlocked with them, and means for mounting said plates and pole-shoes in assembled stacked relation.

6. A magneto rotor comprising a plurality of magnetic plates assembled in stacked relation, and pole-shoes surrounding portions of said plates, said pole-shoes being made up of magnetic laminations in the same plane with the plates on which they are carried, and interlocked with them.

7. A rotor composed of S-shaped steel punchings, having laminated pole-shoes embracing and interlocked with the ends of each punching and in the same plane therewith.

8. A rotor made up of steel punchings, each punching having its polar extremities partially surrounded by thin magnetic laminations having their planes coincident with the plane of the punchings.

CURT FREDERICK REIS.